(12) United States Patent
Wilson et al.

(10) Patent No.: US 10,596,619 B1
(45) Date of Patent: *Mar. 24, 2020

(54) TUBE END SEALING METHOD

(71) Applicant: Shoals Tubular Products, Inc., Muscle Shoals, AL (US)

(72) Inventors: Mark J. Wilson, Muscle Shoals, AL (US); Charles Terry Cook, Muscle Shoals, AL (US)

(73) Assignee: SHOALS TUBULAR PRODUCTS, INC., Florence, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,784

(22) Filed: Oct. 23, 2018

Related U.S. Application Data

(63) Continuation of application No. 15/265,500, filed on Sep. 14, 2016, now Pat. No. 10,105,746.

(60) Provisional application No. 62/218,197, filed on Sep. 14, 2015.

(51) Int. Cl.
 *B21D 53/06* (2006.01)
 *F28F 21/08* (2006.01)
 *F28F 1/06* (2006.01)
 *B23P 15/26* (2006.01)

(52) U.S. Cl.
 CPC .............. *B21D 53/06* (2013.01); *B23P 15/26* (2013.01); *F28F 1/06* (2013.01); *F28F 21/084* (2013.01)

(58) Field of Classification Search
 CPC .......................... Y10T 29/49391; B21D 53/06
 USPC ...................... 29/890.053, 890.052, 890.054
 See application file for complete search history.

(56) References Cited

U.S. PATENT DOCUMENTS 2,408,596 A * 10/1946 Bednar ................ B21D 41/045
 72/69

* cited by examiner

*Primary Examiner* — Jason L Vaughan
*Assistant Examiner* — Amanda Kreiling
(74) *Attorney, Agent, or Firm* — Angela Holt; Bradley Arant Boult Cummings LLP

(57) ABSTRACT

In a method for closing open ends of tubes, an open tube end is closed using spin-tubing methods known in the art. Following the tube end closing, a concavity is formed in the tube end in a tube end forming machine. The tube end is brazed with the tube end facing upright, so that the braze alloy pools in the concavity, strengthening the tube end.

18 Claims, 5 Drawing Sheets

TUBE END SEALING METHOD

REFERENCE TO RELATED APPLICATIONS

This application claims priority to Provisional Patent Application U.S. Ser. No. 62/218,197, entitled "Tube End Sealing Method" and filed on Sep. 14, 2015, which is fully incorporated herein by reference. This application further is a continuation of, and claims priority to, U.S. patent application Ser. No. 15/265,500, entitled "Tube End Sealing Method" and filed on Sep. 14, 2016, which is also fully incorporated herein by reference.

BACKGROUND AND SUMMARY OF THE INVENTION

Historically, copper tubes have been the industry noun for HVAC manifolds. Aluminum tubing has been gaining acceptance in recent years. However, there are additional challenges in closing the ends of aluminum tubes. Tube ends can be closed via a spin tube operation that is known in the art. The spin tube operation closes the tube end, but then braze is applied to strengthen the tube end and make it leak-proof and burst-proof With copper tubes, when braze material is applied to the closed tube end, the viscosity of the brazing medium would form a raised area, resulting in an adequate thickness and strength of the brazed tube end.

With aluminum tubes, however, this prior art method is insufficient. That is because the low viscosity of the aluminum braze alloy causes the alloy to flow over the sides of the tube, instead of thickening on the end of the tube as desired. TIG welding can be used to strengthen the aluminum tube ends, but TIG welding requires specialized welders, safety features and shielding that make it more expensive and time consuming. Brazing is easier than TIG welding and requires no eye protection and no shielding.

The method of the present disclosure solves the problem of closing the end of aluminum tubes by indenting the tube ends after they are spun closed to form a concave tube end. The concave tube end is then brazed, and the braze collects in the concavity and forms a sufficient thickness to strengthen the tube end adequately.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
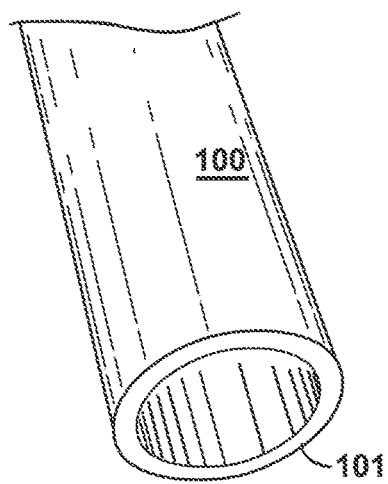
FIG. 1 is a perspective image of a prior art tube before the tube end is closed.
Figure 2:
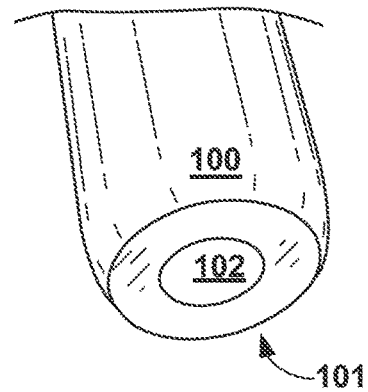
FIG. 2 depicts the tube of FIG. 1 after a traditional spin close operation has been performed.

FIG. 1 is a partial perspective view of a prior art aluminum tube 100, showing an open end 101 of the tube 100 in need of closure FIG. 2 depicts the tube 100 after the tube end 101 has been closed via a spin close operation that is known in the art. The spin close operation is generally performed in a tube end closing machine. A bottom closure 102 now encloses the open end of the tube 100. However, the bottom closure is thin and not complete in the center of the tube end 101.

Figure 3:
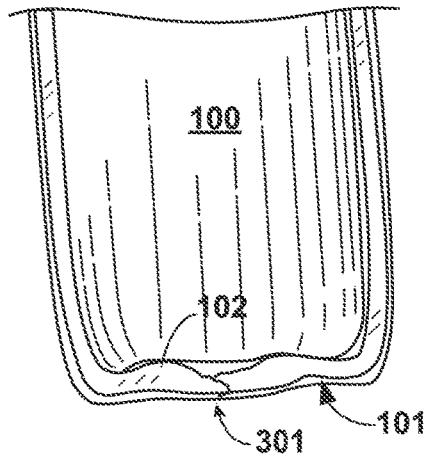
FIG. 3 is a cross-sectional image of the tube of FIG. 2.

FIG. 3 is a cross section of the tube 100 of FIG. 2. Close examination reveals that there is a crack 301 near the center of the tube end 101. Cracks can leak and cause the tube to fail under pressure. If the tube 100 were made of copper, brazing the end of copper tubing after a spin close operation generally works well to close the end of the tube. However, this method doesn't work as well for aluminum tube ends that have merely been spin-closed. This is because the low viscosity of the aluminum brazing alloy causes the alloy to flow over the end of the tube and down the side during the brazing operation when the braze is molten. In other words, the brazing alloy is too thin to build up on the end of the tube and strengthen the bottom closure 102.

Figure 4:
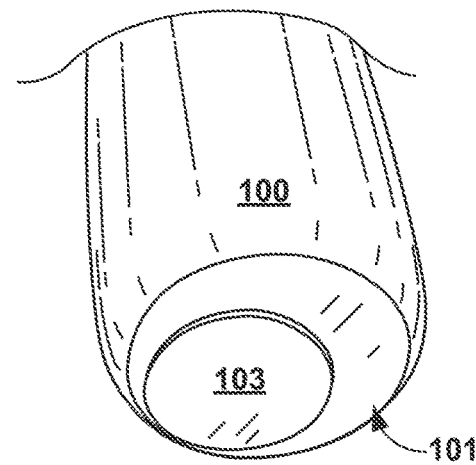
FIG. 4 depicts a tube end after a traditional TIG weld has been used to reinforce the tube end.

The current industry standard is to TIG weld the tube end 101 to make it leak-proof and burst pressure rated. FIG. 4 depicts the tube 100 of FIG. 3 after the tube end 101 has been TIG welded. The TIG weld bead 103 is visible on the tube end 101. TIG welding works to reinforce the tube end. However, TIG welding is a more expensive and time-consuming process than aluminum brazing.

Figure 5:
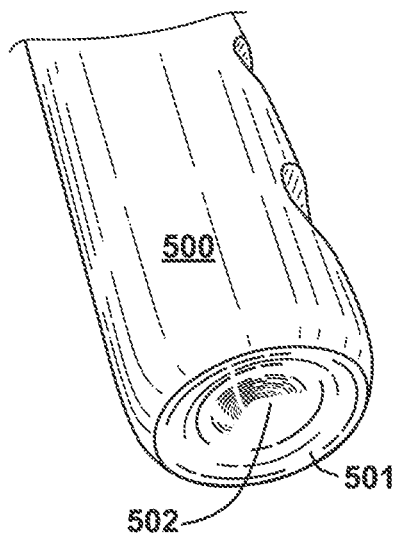
FIG. 5 depicts the tube of FIG. 2 after a concavity has been forming in the tube end.

FIG. 5 depicts a tube 500 that has been spin-closed using traditional spin closing methods (i.e., the tube 100 of FIGS. 2 and 3), but in which the tube end 501 has been subsequently indented to form a concavity 502 in accordance with a method of the present disclosure. In order to form the concavity 502, the tube end 501 is inserted into an end forming machine (not shown). A hydraulic ram with a hemispherical end contacts the tube end and forms the indentation, as further discussed herein.

Figure 6:
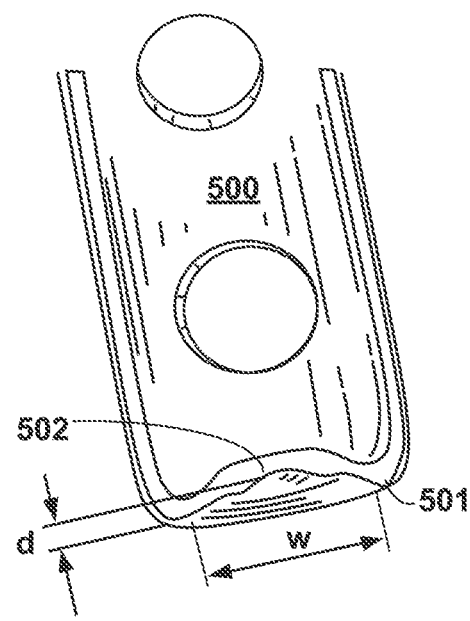
FIG. 6 is a cross-sectional image of the tube shown in FIG. 5.

FIG. 6 is a cross-section of the tube 500 of FIG. 1. (The openings shown in FIGS. 5 and 6 in the tube walls are for manifold tubes that are not relevant to the present disclosure.) The concavity 502 is formed before brazing to allow the braze alloy to pool and form a proper seal on the tube end. For an exemplary 0.750 inch OD tube (with a wall thickness of 0.065 inches), the concavity 502 has a depth "d" of about 0.080 inches and a width "w" of about 0.600 inches. In this example, the concavity width "w" extends across 80% of the overall OD of the tube.

Figure 7:
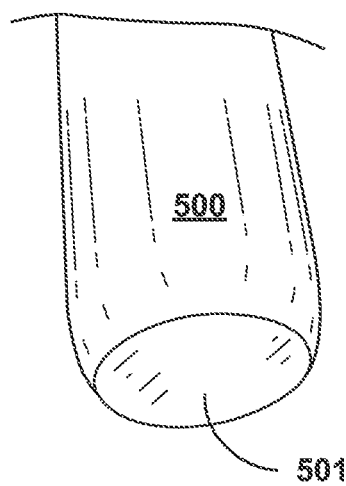
FIG. 7 depicts the tube of FIGS. 5 and 6 following aluminum alloy brazing of the tube end.

FIG. 7 depicts the tube 500 after the aluminum brazing has been performed on the tube end 501. The concavity has been filed by braze, which has pooled into the concavity, resulting in a smooth tube end 501.

Figure 8:
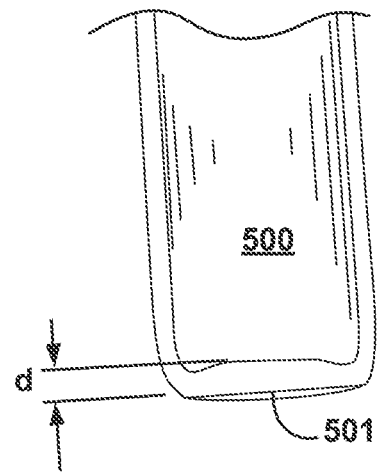
FIG. 8 is a cross-sectional image of the tube of FIG. 7.

FIG. 8 depicts a cross-section of the tube 500 of FIG. 7. The wall thickness of the tube end 501 is now generally greater than the thickness of the tube wall (0.065 inches in the exemplary tube discussed above), and has a thickness "d" at its thickest point of about 0.125 for the 0.750 OD tube discussed above. Thus the resultant thickness "d" of the tube end 501 is at its thickest point 192% of the thickness of the tube wall, or almost twice the thickness of the tube wall.

Figure 9:
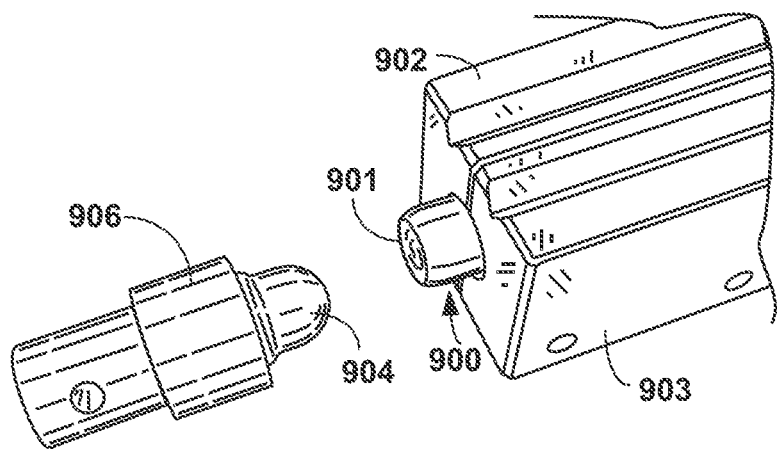
FIG. 9 depicts exemplary tooling used to form the concavity in a tube forming machine.

FIG. 9 depicts exemplary tooling used to form the concavity (not shown) in a tube end forming machine (not shown). A tube 900 is secured by a first clamp 902 and a second clamp 903, with the tube end 901 extending from the clamps 902 and 903. The clamped tube 900 is held stationary by a tube end forming machine, and a concavity tool 906 is pressed into the tube end 901. The concavity tool 906 comprises a semi-spherical protrusion 904 that acts on the tube end 901 to produce the concavity in the tube end 901. The concavity tool 906 is moved hydraulically in one embodiment.

Figure 11:
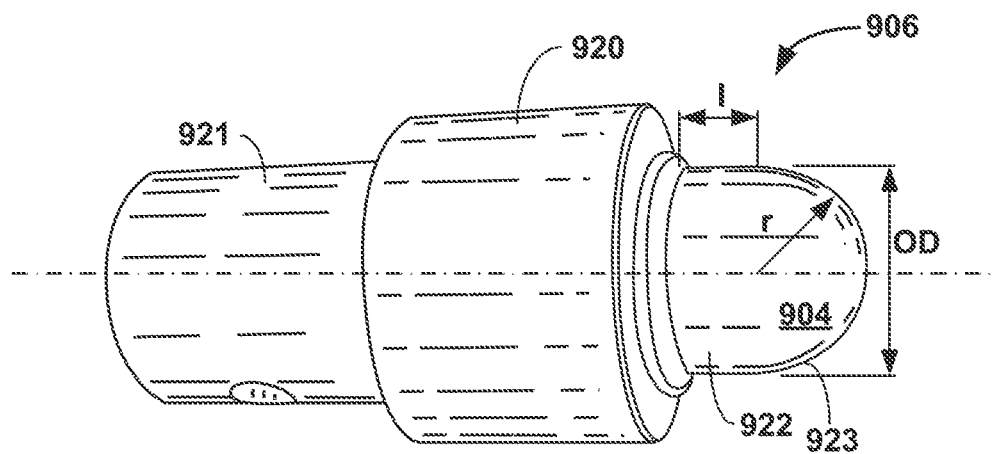
FIG. 11 depicts an exemplary concavity tool for forming the concavity in the tube end.

FIG. 11 is an enlarged image of the concavity tool 906 of FIG. 9. The concavity tool 906 comprises a semi-spherical protrusion 904 extending from a shoulder 920, which extends from a base 921. The protrusion 904 has a diameter "r" and an outer diameter "OD." A straight portion 922 adjacent to a semi-spherical portion 923 has a length "1." In an exemplary embodiment, where the concavity tool is used to create a concavity in a 0.75 inch OD tube, the concavity tool 906 has dimensions r of 0.375 inches, OD of 0.750 inches, and 1 of 0.250 inches.

Figure 10:
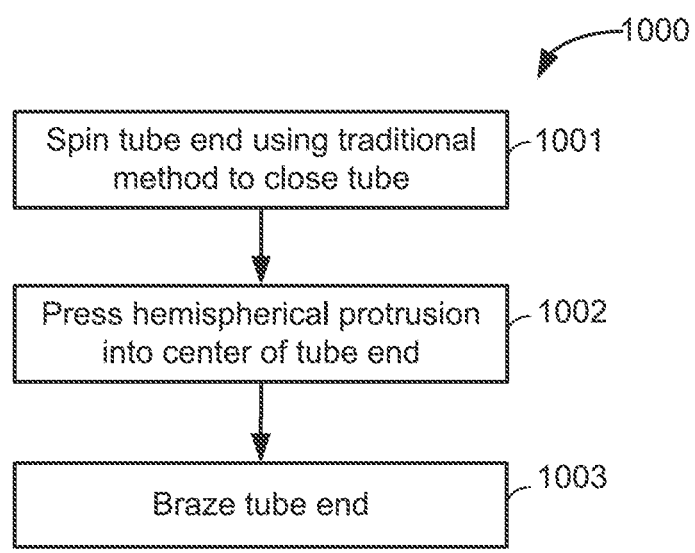
FIG. 10 depicts an exemplary method for forming tube ends using the method described herein.

FIG. 10 depicts an exemplary method 1000 for forming tube ends using the method described herein. In step 1001 of the method 1000, the tube end is closed using the traditional spin-closing methods discussed herein. One such traditional spin-closing method comprises contacting a tooling member (spinning disk, not shown) to an open tube end while the tube is stationary, to cause the tube end to close. The tooling member spins around the circumference of the tube end and is slowly moved radially inwardly until the tube end is closed. This process generally takes place in a tube end closing machine. The tube is then removed from the tube end closing machine. FIG. 1 depicts the tube before the end is spin-closed using this step, and FIGS. 2 and 3 depict the tube after the end has been spin-closed using this step.

In step 1002 of the method 1000, the concavity tool 906 (FIG. 9) contacts the closed tube end 901 (FIG. 9). The concavity tool 906 has a hemispherical protrusion 904 (FIG. 9) that presses into the tube end 901 and forms the concavity. Step 1002 is generally performed in a tube end forming machine, and the tube 900 is removed from the end forming machine after the concavity is formed.

In step 1003 of the method 1000, the tube end is brazed. In this step, the tube end is directed upwardly so that the braze alloy will pool in the concavity.

Figure 12:
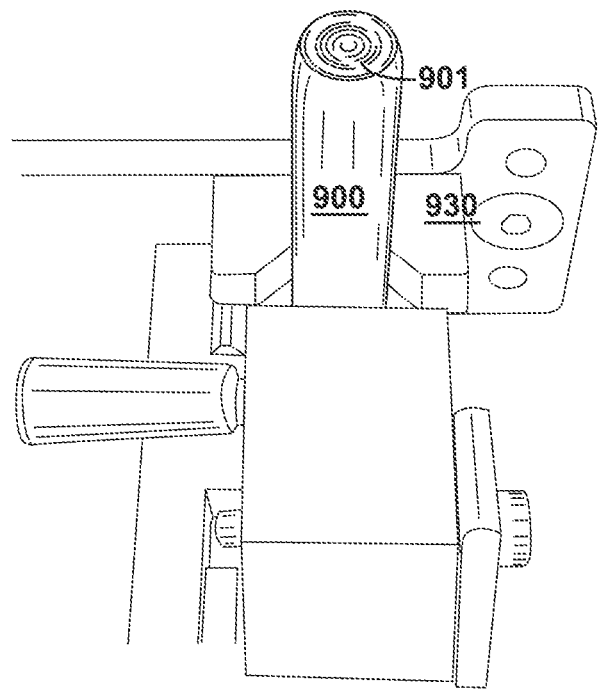
FIG. 12 depicts a closed tube with a concavity clamped into a fixture in preparation for brazing.

FIGS. 12-15 illustrate the brazing method of step 13. FIG. 12 depicts an aluminum tube 900 that has been through step 1002 of the method 1000 (FIG. 10). The tube 900 is clamped into a fixture 930 such that the tube end 901 is facing upwards.

Figure 13:
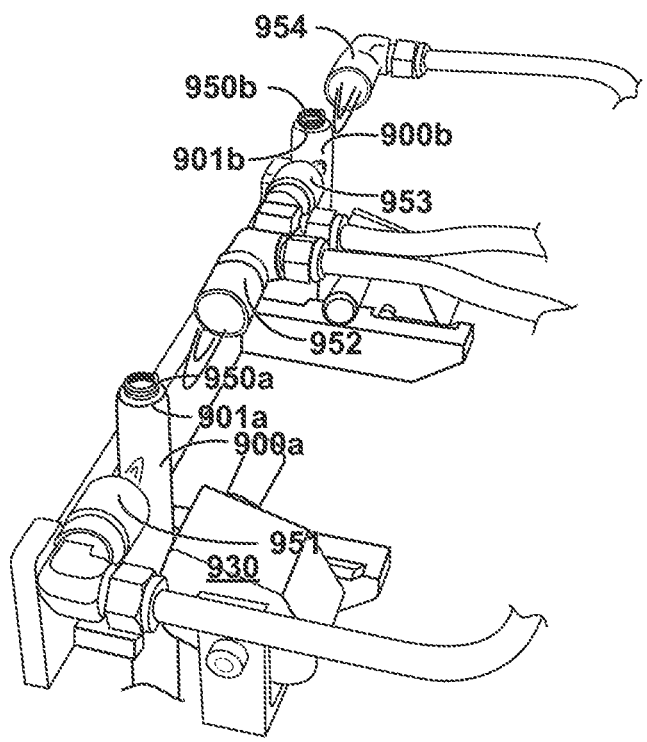
FIG. 13 depicts two closed tubes with braze rings on the tube ends in preparation for brazing.

FIG. 13 depicts two aluminum tubes 900a and 900b clamped into the fixture 930, the fixture 930 configured to retain the tubes 900a and 900b such that the tube ends are facing upwards. A ring 950a of braze alloy and flux has been placed on the tube end 901a of tube 900a. Similarly, a ring 950b of braze alloy and flux has been placed on the tube end 901b of tube 900b. Two brazing torch heads 951 and 952 are directed toward tube end 901a, and two brazing torch heads 953 and 954 are directed toward tube end 901b.

Figure 14:
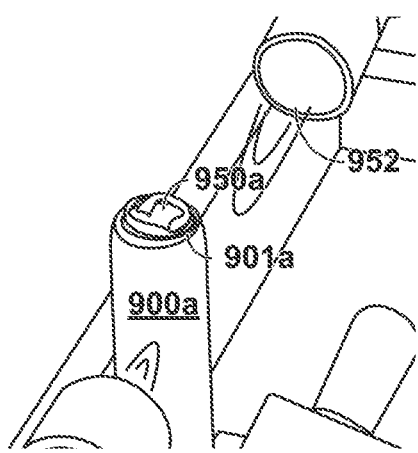
FIG. 14 depicts a tube of FIG. 13 as the braze ring has started to melt.
Figure 15:
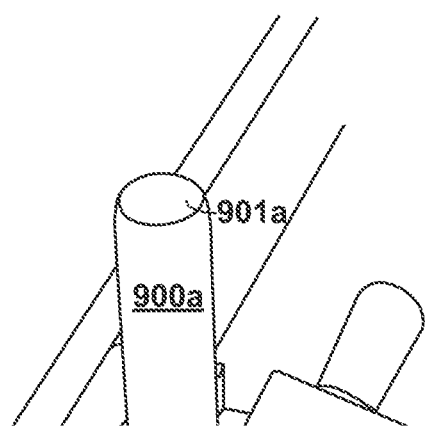
FIG. 15 depicts the tube of FIG. 14 with the braze completely melted.

FIG. 14 depicts the torch head 952 beginning to melt the braze ring 950a on tube end 901a of tube 900a. FIG. 15 depicts the tube end 901a of tube 900a after the braze ring 950 has completely melted and pooled in the concavity. The ring 950a of braze and flux is configured to completely fill the concavity when it melts. For the 0.750 OD tube example discussed herein, 30 grams of braze and flux completely fills the concavity.

What is claimed is:

1. A method for closing open ends of aluminum tubes, the method comprising:
    spin-closing the tube end by contacting a tooling member to the tube end while the tooling member is spinning;
    forming a concavity in the tube end by forcing a protrusion into the tube end;
    brazing the tube end to fill the concavity with aluminum alloy braze.

2. The method of claim 1, wherein the step of brazing the tube end to fill the concavity comprises positioning the tube such that the tube end faces upwardly, brazing the tube end and allowing the braze alloy to pool in the concavity.

3. The method of claim 1, wherein the step of forming a concavity in the tube end by forcing a protrusion into the tube end is performed in a tube end forming machine.

4. The method of claim 1, wherein the step of spin-closing the tube end by contacting a tooling member to the tube end while the tooling member is spinning is performed in a tube end closing machine.

5. The method of claim 1, wherein the step of forming a concavity in the tube end results in a concavity with a width of substantially 80% of the outer diameter of the tube.

6. The method of claim 1, wherein the step of forming a concavity in the tube end results in a concavity with a width of between 70% and 90% of the outer diameter of the tube.

7. The method of claim 1, wherein the step of forming a concavity in the tube end results in a concavity with a depth of substantially 190% of the wall thickness of the tube at the thickest point of the tube end.

8. The method of claim 1, wherein the step of forming a concavity in the tube end results in a concavity with a depth of between 160% and 200% of the wall thickness of the tube at the thickest point of the tube end.

9. A method for reinforcing closed ends of tubes, the method comprising:
    forming a concavity in the tube end by forcing a protrusion into the tube end; and
    brazing the tube end to fill the concavity.

10. The method of claim 9, wherein the step of brazing the tube end to fill the concavity comprises positioning the tube such that the tube end faces upwardly, brazing the tube end, and allowing the braze alloy to pool in the concavity.

11. The method of claim 9, wherein the step of forming a concavity in the tube end by forcing a hemispherical protrusion into the tube end is performed in a tube end forming machine.

12. The method of claim 9, wherein the step of forming a concavity in the tube end results in a concavity with a width of substantially 80% of the outer diameter of the tube.

13. The method of claim 9, wherein the step of forming a concavity in the tube end results in a concavity with a width of between 70% and 90% of the outer diameter of the tube.

14. The method of claim 9, wherein the step of forming a concavity in the tube end results in a concavity with a depth of substantially 190% of the wall thickness of the tube at the thickest point of the tube end.

15. The method of claim 9, wherein the step of forming a concavity in the tube end results in a concavity with a depth of between 160% and 200% of the wall thickness of the tube at the thickest point of the tube end.

16. A method for reinforcing closed ends of tubes, the method comprising:
    indenting the tube end to form an indented tube end;
    brazing the tube end to fill the indented tube end with a braze.

17. The method of claim 16, wherein before the step of indenting the tube end to form an indented tube end is carried out, the tube end is spin-closed by contacting a tooling member to the tube end while the tooling member is spinning.

18. The method of claim 16, wherein the step of indenting the tube end to form an indented tube end is performed by forcing a protrusion into the tube end.

* * * * *